United States Patent [19]
Burke

[11] 3,985,335
[45] Oct. 12, 1976

[54] BALL VALVE

[75] Inventor: Donald J. Burke, Tulsa, Okla.

[73] Assignee: Continental Industries, Inc., Tulsa, Okla.

[22] Filed: June 10, 1975

[21] Appl. No.: 585,513

Related U.S. Application Data

[63] Continuation of Ser. No. 360,654, May 16, 1973, abandoned.

[52] U.S. Cl. .............................. 251/176; 251/259; 251/288
[51] Int. Cl.² ......................................... F16K 25/00
[58] Field of Search ............. 251/85, 162, 167, 184, 251/259, 176, 288

[56] References Cited
UNITED STATES PATENTS

| | | | |
|---|---|---|---|
| 2,650,059 | 8/1953 | Hjulian | 251/259 |
| 3,368,790 | 2/1968 | Burke | 251/163 X |
| 3,403,886 | 10/1968 | Barker | 251/163 |
| 3,572,370 | 3/1971 | Engle | 251/163 X |

*Primary Examiner*—Harold W. Weakley
*Attorney, Agent, or Firm*—Head, Johnson & Chafin

[57] ABSTRACT

This invention relates to a ball type shut off valve. The valve includes a body having a flow passage therethrough defining a seat. A ball is loosely held within the flow passageway by the two ends of a shaped, flat strip spring which is held in a longitudinal diametral slot, in a cylindrical shaft positioned in and sealed to the body, with the axis of the shaft at right angles to the longitudinal axis of the body, and to the flow path of the fluid. Rotation of the shaft causes the strip spring to rotate and to control the position of the ball relative to the seat. Rotation in one direction causes a first end of the spring to move the ball away from the seat. Rotation of the shaft and the spring in the other direction causes the second end of the spring to move onto the sea and to hold the ball against the seat by the compliance of the second end of the spring. The resilience of the spring is used in such a way that the pressure holding the ball against the seat is independent of the precise angular rotation of the shaft and is limited only by the spring construction itself.

7 Claims, 5 Drawing Figures

BALL VALVE

CROSS REFERENCE TO RELATED PATENTS

This is a continuation of application Ser. No. 360,654, filed May 16, 1973, now abandoned.

This invention is related to U.S. Pat. Nos. 3,343,803 and 3,467,355, both assigned to the assignee of this application and related to the same subject matter.

BACKGROUND OF THE INVENTION

This invention is in the field of fluid control devices. More specifically it is related to ball type valves used for the control of fluids. Still more specifically it is particularly adapted for use in the gas industry to shut off gas flow lines, such as those from a main line to a residence.

One problem with the prior art type of ball valves is that the mechanism for forcing the ball onto the valve seat must be accurately machined, otherwise a firm seat is not achieved. If too much force is applied on the ball against the seat either the seat or the ball will be damaged. Any permanent deformation of the ball or seat will result in leakage upon subsequent seating of the ball. Therefore the design and manufacture of a successful ball valve has required very accurate machining tolerances. In addition, in the prior art devices the ball control element, which urges the ball onto the seat has caused a reduction in the pressure of the ball against the seat, reducing the sealing effectiveness of the valve.

Conventional ball valves usually require rubber, plastic or other compliant material to obtain the necessary seal resiliency. This is a serious detriment in gas service since a fire can cause the rubber or plastic seat to melt, resulting in valve failure. The valve of this invention eliminates this problem by providing a metal to metal resilient seat. In addition, many conventional ball valves require an expensive ball construction, having a slot formed through the center of the ball for passing of fluid. This invention provides a valve having a solid ball, which is much less expensive to manufacture.

To overcome basic problems of ball type valves, that is, accuracy of machining and manufacture, and leakage caused by wear of the parts, this invention provides a resilient means of urging the ball onto the seat. Such resilient means compensates for inaccuracies in manufacturing and for wear of components. The resilient arrangement obviates the possibility of damaging the ball or the seat and causing potential leakage of the valve. In addition wear is compensated by the resilient means within the valve.

SUMMARY OF THE INVENTION

It is a primary object of this invention to provide a valve having improved means for resiliently urging a ball into sealing engagement with the valve seat when the valve is in the closed position.

More particularly, it is an object of this invention to provide this resiliency in the form of a flat strip-type spring attached to and rotatable with an operating shaft sealed into the body of the valve, and so convoluted that one end of the spring is used to remove the ball from the seat, and the other end of the spring is used to urge the ball onto the seat and to retain it on the seat by exerting a resilient force.

These and other objects are realized and the limitations of the prior art are overcome in this invention by the use of a metal sphere to seal against a metal seat, across the flow channel of a valve body. The ball is controlled by a convoluted flat strip metal spring attached to and rotatable with a shaft inserted into and sealed into the body of said valve, the axis of the control shaft being at right angles to the axis of the body and of the flow-channel. By rotating the control shaft through 90° one end of the spring in one position removes the ball from the seat, providing a clear passage through the valve. In the other position the second end of the spring urges the ball onto the seat and holds it there by a resilient force.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 1:
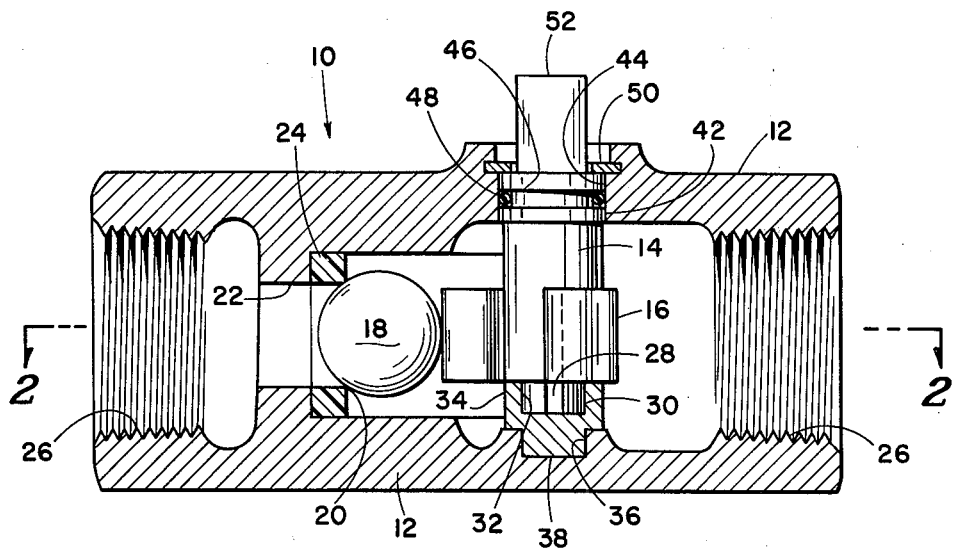
FIG. 1 represents a longitudinal cross section through the valve. The plane of the cross section is through the axis of the control shaft.

Referring to the drawings and in particular to FIG. 1, there is shown in cross section one embodiment of this invention. It comprises a longitudinal metal valve body 12 with pipe connection means at each end 26 forming a longitudinal flow channel through a circular opening 22 which is sealed at an edge 20 by means of a metal ball or sphere 18. The seal is between the ball and a metal ring insert 24, and the tightness of the seal is a function of the pressure of the ball against the seat. This pressure is controlled by a strip-type convoluted metal spring means 16 which is shown more clearly in FIGS. 2 and 3. There is a control shaft 14 which is inserted in a direction perpendicular to the flow channel. The control shaft is made of two parts, a primary cylindrical portion 14 which has a diametral, longitudinal slot 28 into which is inserted the flat leaf spring 16. The internal end of the shaft is turned to a lesser diameter 30 and a cap 34 bored out to a surface 32 is adapted to slip over the lower portion 30 of shaft 14. This cap locks the strip spring 16 into the slot 28 and in addition, provides a portion 38 of reduced diameter which is rotatably received in a bored depression 36 in the wall of the valve body.

The other end of the shaft 14 has an enlarged diameter portion 42 which rotates in a cylindrical opening 44. There is a groove 46 in the shaft into which is positioned an O-ring 48 which provides a seal between the enlarged portion 42 and the opening 44 in the body of the valve. A clip ring 50 is used to lock the shaft in position in the valve. The outer end of the shaft 52 is formed with flats 54 so that a wrench or other means can be provided to turn the shaft from one position to another.

Figure 2:
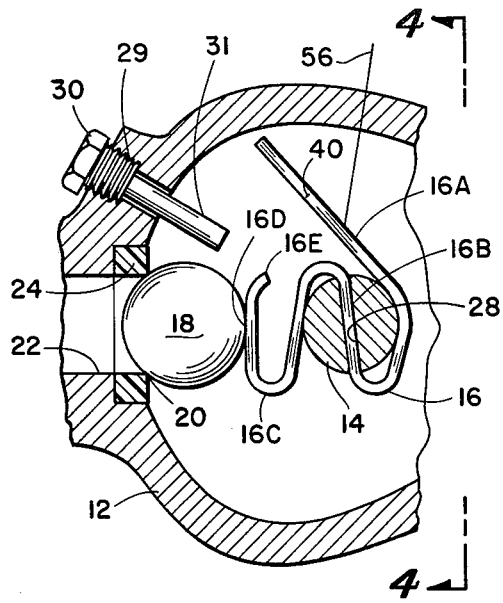
FIGS. 2 and 3 show cross sections through the valve taken at right angles to the plane of the cross section of FIG. 1.

Refer now to FIG. 2 which is a view taken along the plane 2—2 of FIG. 1. This shows again the flow passage 22 and the sealing ring 24 and the ball 18, providing a seal at edge 20. This is the position of the ball when the valve is closed. There is a pin 28 which is positioned in the wall of the valve 12. This can be made removable, if desired, by providing screw threads 29 and head 30 for tightening the pin in the opening so as to seal against fluid leakage.

The convolutions of the flat strip spring 16 is shown clearly in FIG. 2. There is a portion 16B which is adapted to fit within the slot 28 in the shaft 14. A first end 16A of the spring is bent around the shaft in a counterclockwise direction and has a long extension 16A, in the end of which is a slot 40 (better shown in FIG. 4) adapted to permit the passage of the pin 31 through the slot 40, as the shaft 14 is turned counterclockwise to the position shown in FIG. 3.

The second end of the spring forms an S shape having the second end 16E, and a bend at 16C. The surface 16D is adapted to press against the ball 18 and provide sufficient pressure to hold the ball closed against the seat. The force by which the surface 16D presses against the ball is determined by the strip itself and the convolution at the loop 16C and is independent of the precise angular position of the shaft. Therefore once the springs are manufactured according to a specific design they can be inserted into the valves and they will always provide the desired pressure against the ball, and do not require any precise machineing or adjustment of the valve.

Figure 3:
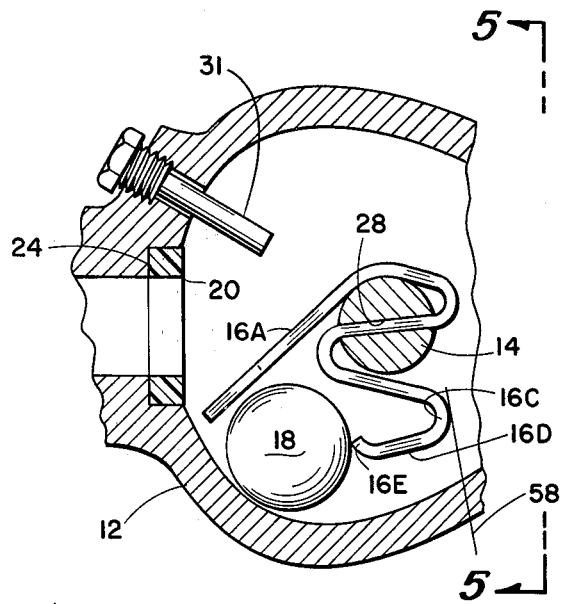

From the position of the shaft 14 shown in FIG. 2 the shaft can be rotated counterclockwise about 90° at which time the configuration of FIG. 3 will be evident. The arm 16A sweeps past the pin 31. By that time the portion 16E has been turned past the ball and since the ball is no longer pressed against the seat the arm 16A can move the ball with it in a counterclockwise direction to the position shown in FIG. 3. From the position shown in FIG. 3 if the shaft is turned in a clockwise direction, the ball 18 is then urged by the end 16E of the spring 16 in a clockwise direction, until it reaches the pin 31 where it is prevented from going beyond the seat 20. Then as the shaft 14 is turned farther in a clockwise direction the tip 16E of the spring goes beyond the ball as the spring compresses and finally the surface 16D presses against the ball and forces it onto the seat.

Means, not shown, can be provided for restraining the rotation of the shaft 14 to between the two positions shown roughly in FIGS. 2 and 3. This can be done exterior to the body of the valve by means attached to shaft extension 52, as well known in the art, or it can be done inside the valve by means of pins at position 56 in FIG. 2 and 58 in FIG. 3 for example.

While not shown it is possible to provide set screw means or similar means to rigidly hold the spring in the slot 28, however, if the design of the convolutions is adequate this type of restraint would not be necessary.

Also while one selected convolution of the spring has been shown, there are many others that can be devised which will provide, in combination, (1) means to move the ball off the seat, (2) means to move the ball towards the seat, and (3) means to lock the ball against the seat, as is accomplished by the spring shown. No limitation is intended by the particular shape and convolution of the spring shown in the drawings.

Figure 4:
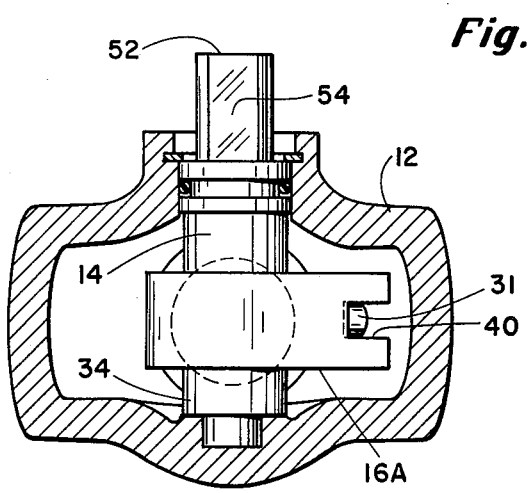
FIGS. 4 and 5 show partial cross sections of the valve taken perpendicular to the views shown in FIGS. 2 and 3 respectively.
Figure 5:
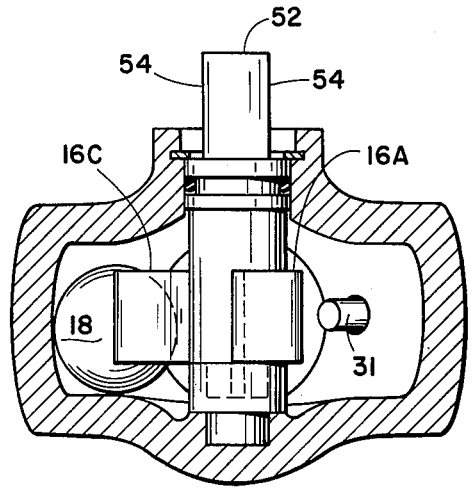

FIGS. 4 and 5 are additional views along the plane 4—4 and 5—5 respectively of FIGS. 2 and 3. These add further visualization to the structure of the valve of the rotating shaft and of the spring control means.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A valve comprising:
    a body having a flow passageway therethrough;
    a shaft sealably journalled in said body with its axis substantially at right angle to said flow passageway, and in the plane of said flow passageway being defined in part by a valve seat;
    a ball freely movable in a portion of said passageway against said valve seat to close the valve; and
    an actuating arm of flat spring material in a plane at right angle to said shaft, said plane passing through said flow passageway, said arm having two portions extending out from said shaft, a first portion in such position on rotation of said shaft in a first direction to move said ball away from said seat and an S-shaped second portion in such a position on rotation of said shaft in a second direction to move said ball toward said seat, said second portion having at least one substantially 180° bend and a part of said second portion when said ball is on said seat serving to exert a compressive force between said shaft and said ball to press said ball in a radial direction into sealing contact with said seat.

2. A valve according to claim 1 in which said shaft has a longitudinal diametrical slot therein, the slot receiving an intermediate portion of said flat spring actuating arm as a means of attaching the actuating arm to said shaft.

3. A valve according to claim 2 including:
    an extension member received by an interior recess in said valve body, the extension member being coaxial with said shaft and having a cup shaped portion receiving the end of said shaft, the cup shaped portion serving to retain said actuating arm in said longitudinal diametrical slot.

4. A valve according to claim 1 including a ball restraining means near one side of said passageway.

5. A valve according to claim 4 in which said restraining means is a pin inserted into the wall of the valve body.

6. A valve according to claim 5 wherein said actuating arm first portion has a slot therein to permit passage of said arm past said pin.

7. A valve according to claim 1 including means to limit the rotation of said shaft to about 90°.

* * * * *